July 6, 1965   J. E. ADAMS   3,193,237
BODY MOUNTING FASTENER FOR AUTOMOBILES
Filed April 23, 1962

INVENTOR.
JAMES E. ADAMS
BY
Malcolm W. Fraser
ATTORNEY

United States Patent Office 3,193,237
Patented July 6, 1965

3,193,237
BODY MOUNTING FASTENER FOR
AUTOMOBILES
James E. Adams, Toledo, Ohio, assignor, by mesne assignments, to The Bishop and Babcock Corporation, Toledo, Ohio, a corporation of Ohio
Filed Apr. 23, 1962, Ser. No. 189,418
1 Claim. (Cl. 248—358)

This application is a continuation-in-part of my co-pending application Serial No. 166,773, filed January 17, 1962, and entitled Automobile Body Mounting Fastener.

This invention relates to resilient mounts for attaching a motor vehicle body to the frame in such manner that the body is insulated from the frame against noise and vibration.

In my copending application Serial No. 166,773, filed January 17, 1962, and entitled Automobile Body Mounting Fastener, I have shown an assembly embodying a flanged tube which is surrounded by rubber blocks interposed between the body and the frame members and which are placed under such compressive forces that the tube has buckled. It has therefore been a source of trouble. This invention has been developed to overcome the difficulty and to produce a fastener assembly of the above character, which satisfactorily withstands the forces to which it is subjected without crushing, buckling or other impairment.

An object is therefore to produce a vehicle body mount having greater strength characteristics to overcome a weakness which has been found to be inherent in prior structures.

Figure 1:
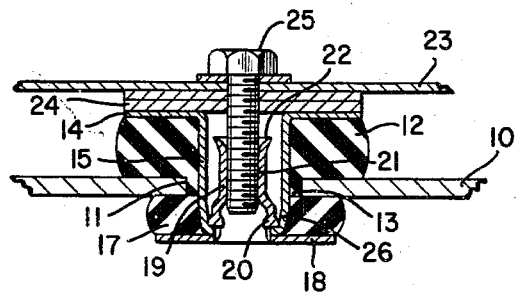
Figure 3:
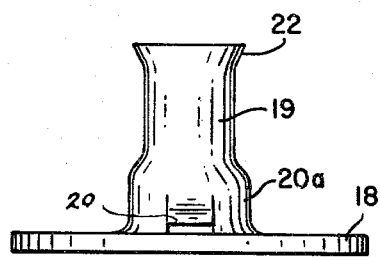
Figure 2:
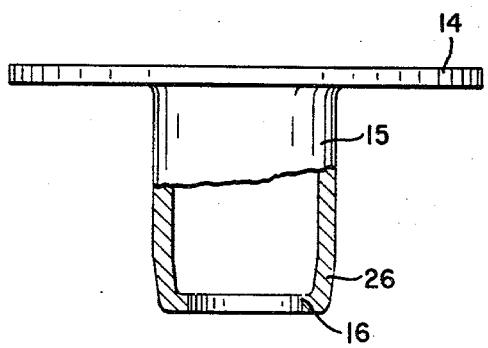

Other objects and advantages of the invention will hereinafter appear and, for purposes of illustration but not of limitation an embodiment of the invention is shown on the accompanying drawings, in which FIGURE 1 is a sectional view showing the body mount fastener installed on a vehicle frame member secured to a vehicle body member;

FIGURE 2 is a fragmentary sectional side elevation on an enlarged scale of the sleeve member forming a part of the body mount fastener; and FIGURE 3 is an enlarged side elevation of the other sleeve member forming a part of the body mount fastener and which fits into the sleeve fastener shown on FIGURE 2.

The illustrated embodiment of the invention comprises a motor vehicle frame 10 formed with an aperture 11 which receives a rubber insulator-spacer block 12 having a sleeve-like extension 13, which projects into the aperture 11. A fastener member having a metallic disc-like head 14 bears against one end of the outer end of the rubber spacer block 12 and is formed with an integral, centrally disposed elongate sleeve 15, which extends through the opening in the rubber block to the opposite side of the vehicle frame member 10. It is formed at its lower end with an inwardly extending annular lip or flange 16. Another insulator-spacer block 17 of rubber engages the opposite side of the vehicle frame member 10 and surrounds the adjacent portion of the sleeve 15.

Another portion of the fastener assembly includes a part having a disc-like head 18 which flatly abuts the outer end of the rubber block 17. It is formed with an axially extending sleeve 19 which projects inside of sleeve 15.

Formed on the sleeve 19 adjacent to the head 18 are flanges or shoulders 20 formed on an outwardly flared base portion 20a. These flanges 20 normally project inwardly of the portion 20a but by a suitable tool are forced outwardly to provide flanges overlying the annular lip 16. This operation is performed by exerting pressure on the flanged heads 14 and 18, compressing the rubber therebetween and while the rubber blocks 12 and 17 are held under compression, the flanges 20 are forced outward thereby to lock the parts together with the rubber blocks under compression. The interior portion of the sleeve 19 is screw threaded and the outer end portion is provided with a flared mouth 22.

It will be understood that the flanged head 14 is disposed on the under side of a vehicle body panel 23 and interposed therebetween are shims or washers 24. Extending from the opposite side of the panel 23 is a bolt 25 which is in screw threaded engagement with the sleeve 19, thereby to hold the vehicle body panel 23 to the vehicle frame part or panel 10, the connection being such that the rubber blocks insulate these parts from noises due to vibrations and rattles.

The structure above described is fully set forth and described in more detail in my co-pending application above identified. Certain objections were inherent in the fastener assembly shown in such application. In particular it was found that when the parts were compressed, for example to the extent of about five hundred pounds per square inch, the stresses imposed upon the sleeve 15 were such that it buckled and thus seriously interfered with the efficient operation of the body mount. This objection has been overcome by slightly inclining in an inner direction and in rectilinear manner the lower end of the sleeve 15, substantially as indicated at 26. This downward and inward inclination of such portion affords a strut-like portion, which under conditions of service, has been found satisfactorily to cope with the problem and solve the difficulty heretofore experienced. In use it is found that the formation of the strut-like lower end of the sleeve 15 greatly increases by as much as 25%, the strength of the part. Thus by extremely simple means an outstanding difficulty heretofore experienced has been solved, rendering the body mount assembly sturdy and rigid for the purpose intended.

Numerous changes in details of construction, arrangement and operation may be effected without departing from the spirit of the invention especially as defined in the appended claim.

What I claim is:

A body mount for connecting body components to an apertured vehicle frame comprising:

a pair of apertured resilient insulation blocks disposed on opposite sides of the vehicle frame part and with the latter in contact only with the inner faces of said insulator blocks;

a sheet metal part having an end flange engaging the outer face of one of said insulator blocks, said sheet metal part having an integral sleeve extending at right angles to said end flange, said sleeve having an inwardly tapered cylindrical strut portion adjacent the free end thereof, said sleeve having a radially inwardly extending lip portion on the free end thereof, said sleeve projecting through and in contact with said one apertured insulator block, the vehicle frame part, and into and substantially through and in contact with the other of said insulator blocks whereby the inwardly extending lip portion of said sleeve is substantially in the same plane as the outer face of said other insulator block; and a sheet metal securing part having an end flange engaging the outer face of said other insulator block, said sheet metal securing part having an integral sleeve extending from said end flange and having substantially its entire length projecting coaxially within the sleeve of said sheet metal part, said sleeve having a reduced internally screw threaded portion spaced from said last end flange, and spaced rigid shoulders comprised of metal struck from said sleeve in the portion thereof adjacent said last end flange, said spaced rigid shoulders projecting outwardly from said last integral sleeve and overlying the inwardly extending lip portion of said first sleeve, whereby in the assembled form of the body mount the free end of the integral sleeve of said first mentioned sheet metal part is in juxtaposed contact with the end flange of said second mentioned sheet metal securing part.

References Cited by the Examiner
UNITED STATES PATENTS 2,514,811 7/50 Stephenson et al. _____ 248—9
2,976,080 3/61 Moore _____ 248—358 X CLAUDE A. LE ROY, *Primary Examiner.*

EDWARD C. ALLEN, *Examiner.*